United States Patent [19]

Green et al.

[11] Patent Number: 5,397,631
[45] Date of Patent: Mar. 14, 1995

[54] COATED FIBROUS MAT FACED GYPSUM BOARD RESISTANT TO WATER AND HUMIDITY

[75] Inventors: George W. Green; Brian G. Randall, both of Stone Mountain, Ga.

[73] Assignee: Georgia-Pacific Corporation, Atlanta, Ga.

[21] Appl. No.: 93,798

[22] Filed: Jul. 19, 1993

Related U.S. Application Data

[63] Continuation of Ser. No. 806,810, Dec. 6, 1991, abandoned, which is a continuation of Ser. No. 539,363, Jun. 15, 1990, abandoned, which is a continuation of Ser. No. 221,313, Jul. 19, 1988, abandoned, which is a continuation-in-part of Ser. No. 121,219, Nov. 16, 1987, abandoned.

[51] Int. Cl.$^6$ .................. B32B 15/00; B32B 13/00; B32B 5/16
[52] U.S. Cl. ........................... 428/219; 428/220; 428/283; 428/284; 428/285; 428/288; 428/290; 428/703
[58] Field of Search ............. 428/219, 220, 283, 284, 428/285, 298, 290, 703

[56] References Cited

U.S. PATENT DOCUMENTS

| | | |
|---|---|---|
| 2,206,042 | 7/1940 | Novak . |
| 2,208,232 | 7/1940 | Smolak . |
| 2,776,234 | 1/1957 | Riddell et al. . |
| 2,954,302 | 9/1960 | Gorman, Jr. . |
| 3,289,371 | 12/1966 | Pearson et al. . |
| 3,307,987 | 3/1967 | Bieri . |
| 3,383,271 | 5/1968 | Roberts et al. . |
| 3,389,042 | 6/1968 | Bieri et al. . |
| 3,607,486 | 9/1971 | Jacks et al. . |
| 3,824,147 | 7/1974 | Baird ............................. 428/703 |
| 3,839,141 | 10/1974 | McKinnon ..................... 428/703 |
| 3,839,141 | 10/1974 | McKinnon . |
| 3,929,947 | 12/1975 | Schwartz et al. . |
| 3,935,021 | 1/1976 | Greve et al. . |
| 3,947,398 | 3/1976 | Williams ............................. 524/5 |
| 3,993,822 | 11/1976 | Knauf et al. . |
| 4,020,237 | 4/1977 | von Hazmburg . |
| 4,067,939 | 10/1978 | Lowe et al. . |
| 4,073,997 | 2/1978 | Richards et al. . |
| 4,077,168 | 3/1978 | Smith . |
| 4,204,030 | 5/1980 | Takamizawa et al. . |
| 4,242,406 | 12/1980 | El Bouhnini et al. . |
| 4,265,979 | 5/1981 | Baehr et al. . |
| 4,287,103 | 9/1981 | Francis et al. . |
| 4,333,863 | 6/1982 | Lindroth . |
| 4,372,814 | 2/1983 | Johnstone et al. . |
| 4,378,405 | 3/1983 | Pilgrim . |
| 4,447,498 | 5/1984 | Fink et al. . |
| 4,470,877 | 9/1984 | Johnstone et al. . |
| 4,548,676 | 10/1985 | Johnstone et al. . |
| 4,647,496 | 3/1987 | Lehnert et al. . |
| 4,664,707 | 5/1987 | Wilson et al. . |
| 4,722,866 | 2/1988 | Wilson et al. . |
| 4,810,569 | 3/1989 | Lehnert et al. . |
| 4,879,173 | 11/1989 | Randall . |

FOREIGN PATENT DOCUMENTS

| | | |
|---|---|---|
| 721719 | 11/1965 | Canada . |
| 993779 | 7/1976 | Canada . |
| 2808723 | 6/1979 | Germany . |
| 3508933 | 10/1986 | Germany ............... B32B 13/02 |
| 2053779A | 2/1981 | United Kingdom . |

OTHER PUBLICATIONS

*1984 Handbook for Ceramic Tile Installation,* Tile Council of America, Inc. (1983).
*1989 Handbook for Ceramic Tile Installation,* Tile Council of America, Inc. (1988).
*Standard Methods of Fire Tests of Building Construction and Materials ASTM E 119–83,* Report No. 60712, Test No. 1897–1655, (Jan. 11, 1988), Prepared for Georgia–Pacific Corporation, Decatur, Ga., by Commercial Testing Company, Dalton, Ga.

(List continued on next page.)

*Primary Examiner*—James D. Withers
*Attorney, Agent, or Firm*—Synnestvedt & Lechner

[57] ABSTRACT

A fibrous mat-faced gypsum board is coated with a water-resistant resinous coating.

29 Claims, No Drawings

OTHER PUBLICATIONS

*Standard Methods of Fire Tets of Building Construction and Materials ASTM E 119-83,* Report No. 60604, Test No. 1894-1530, (Jan. 15, 1988), Prepared for Georgia-Pacific Corporation, Decatur, Ga., by Commercial Testing Company, Dalton, Ga.

Georgia-Pacific Trade Literature for DENS—GLASS ® Gold (Oct., 1989).

Georgia-Pacific Trade Literature for DENS-Shield ® (Jun., 1988).

Field Report: "Shower Areas—Bonding to Water Resistant Gypsum Backing Board", Ceramic Tile Institute (1984).

ASTM Specification C 36-85, "Standard Specification for Gypsum Wallboard" (Nov., 1985).

ASTM Specification C 630-90, "Standard Specification for Water-Resistant Gypsum Backing Board" (Aug., 1990).

USG Trade Literature, 3rd Edition, "Gypsum Construction Handbook" (1987).

*American National Standard Specifications for the Installation of Ceramic Tile,* Tile Council of America, Inc. (1985).

Tile Council of America, Inc., "Ceramic Tile: The Installation Handbook," 1987, pp. 21-22, 24-25, Princeton, NJ.

ATTMCA Survey on Substrates.

Den-Shield Sales Graph.

COATED FIBROUS MAT FACED GYPSUM BOARD RESISTANT TO WATER AND HUMIDITY

This is a continuation application of Ser. No. 07/806,810, filed Dec. 6, 1991 (now abandoned), which is a continuation application of application Ser. No. 07/539,363, filed Jun. 15, 1990, (now abandoned), which is a continuation application of application Ser. No. 07/221,313, filed Jul. 19, 1988, (now abandoned), which is a continuation-in-part application of application Ser. No. 07/121,219, filed Nov. 16, 1987, (now abandoned).

FIELD OF THE INVENTION

This invention relates to improved water-resistant fibrous mat-faced gypsum board, for example, gypsum board faced with glass fiber mat. More particularly, the present invention relates to fibrous mat-faced gypsum board coated with a water-resistant coating.

This invention will be described initially in connection with its use as a "tile backer" in bathroom applications. However, the present invention has other uses as will become apparent from the detailed description of the invention which appears hereinbelow.

Panels of gypsum wallboard which comprise a core of set gypsum sandwiched between two sheets of facing paper have long been used as structural members in the fabrication of buildings where the panels are used to form the partitions or walls of rooms, elevator shafts, stair wells, ceilings and the like. A specialty application for the use of panels of gypsum wallboard, as well as other types of building panels, is the use thereof in bathrooms—typically a place of high humidity and residual water because of the flow of water from the use of showers, bathtubs, and sinks.

The usual construction of bathroom walls includes a multi-ply structure of ceramic tile adhered to an underlying base member, for example, a panel of wallboard comprising gypsum or other material as will be described below. Such a panel is referred to in the industry as a "tile backing board," which for convenience is referred to herein as "tile backer". In usual fashion, sheets of tile backer (for example, $4' \times 8' \times \frac{1}{2}''$) are fastened by rust-resistant nails or screws to studs. Blocks of ceramic tiles (for example, $4'' \times 4''$) are adhered to the sheets of tile backer by water-resistant adhesive which is referred to in the industry as "mastic" or by a Portland cement-based adhesive which is referred to commonly as "thin set mortar". Thereafter, spaces between the tiles and between the tiles and other adjoining surfaces, for example, the lip of a bathtub or sink, are filled with a water-resistant material which is referred to in the industry as "grouting".

It should be appreciated that a primary goal in constructing a bathroom that includes one or more of a bathtub, shower and sink is to make the contiguous and adjacent walls water-tight utilizing materials that resist being degraded by water, including hot water. Tiles made from ceramics are such materials and are basically inert to both the hot and cold water with which the tiles come into direct contact.

It is important also that the tile backer to which the tiles are adhered be water-resistant. Theoretically, it would seem that the water-resistant properties of the tile backer should be inconsequential because the backer is shielded from shower, bath and sink water by water-resistant tiles, grouting and mastic. However, experience has shown this is not the case and that moisture can and does in fact seep through the plies of material which overlie the tile backer. This can happen in various ways.

One way has to do with the fact that grouting is not water-impervious and permits the seepage of moisture, a situation which is aggravated upon the formation of cracks, including hairline cracks, in the grouting. Eventually, the moisture which penetrates through the grouting finds its way through the mastic and comes into contact with the paper facing of the wallboard. Such paper facing is typically a multi-ply paper, which upon contact with moisture tends to degrade by delaminating or otherwise deteriorating. For example, the paper facing is subject to biological degradation from mold and mildew. The paper can actually rot away. Furthermore, as the moisture comes into contact with the underlying set gypsum core, it tends to dissolve the set gypsum and also the core adhesive which bonds the core and paper facing together. Such adhesive is typically a starch material. The development of these conditions can lead to tiles coming loose from the underlying deteriorated paper-faced gypsum wallboard. This undesirable situation is exacerbated when hot water comes into contact with the paper-faced wallboard.

Another type of moisture condition which leads to the loosening or falling off of tiles from their underlying support substrate is associated with those segments of the multi-ply wall structure which include a joint formed from an edge portion of the wallboard. An example is the joint formed by the edge of a wallboard panel and the lip of a bathtub. Another example is the joint formed by two contiguous wallboard panels. As moisture penetrates through the multiply structure and reaches such a joint, it tends to wet significant portions of the paper facing and core by virtue of its spreading through capillary action. This can lead to delamination of the paper facing and/or dissolution of the core and/or the paper/core adhesive. As this occurs, tiles can come loose and fall off.

The present invention relates to the provision of an improved water-resistant gypsum-based structural panel of the type which can be used effectively as a tile backer and in other applications where water and humid conditions are encountered.

REPORTED DEVELOPMENTS

In an effort to mitigate or overcome problems associated with the use of paper-faced gypsum wallboard in tile backer and similar applications, inventors have approached the problem in various ways over the years.

One approach to the problem has been to treat the paper comprising the facing of the wallboard with a water-resistant material sometimes referred to as a water-repellant. Polyethylene emulsion is an example of a material which is used to treat paper facing to impart water-resistant characteristics thereto. Such treatment is designed to deter delamination of the multi-ply paper facing by reducing the tendency of the paper to absorb water which is a cause of delamination and to deter water from penetrating through the paper to the gypsum and destroying the bond between the paperfacing and core.

Another approach to the problem has involved incorporating into the formulation from which the gypsum core is made a material which functions to impart improved water-resistant properties to the set gypsum core. Such an additive tends to reduce the water-absorbing tendency of the core and decrease the solubility characteristics of the set gypsum. Wax-asphalt emulsion is an example of such an additive.

Although improvements have been realized by the provision of gypsum wallboard faced with a water-resistant paper and having an improved water-resistant core, such improvements have not been accepted as an entirely satisfactory solution to the problem. Over a period of time, experience shows that tiles come loose from tile backer of the aforementioned type as the paper facing delaminates and the gypsum core erodes through the degrading action of moisture. The problem is particularly aggravated by warm water acting upon a gypsum core which includes wax-asphalt emulsion, one of the most popularly-used, water-resistant core additives. While cores containing such material have quite good water-resistant characteristics in the presence of water at room temperature, such characteristics start to fall off at temperatures in excess of 70° F. and tend to disappear in the presence of water having a temperature of about 100° F. or higher.

Still another approach to the problem is exemplified in commercially available structural panels comprising a Portland cement-based core sandwiched between facings of woven glass mat treated with a resinous material such as poly(vinyl chloride). The cement constituent of such products is more water-resistant than set gypsum, but such cement-based panels have a relatively high weight, and accordingly, are difficult to handle and expensive to ship. It is known to include expanded polystyrene in the cement-based core to reduce the weight, but even such lower weight panels are heavy enough to be unwieldy, weighing about 3000 to about 3500 lbs./1000 sq. ft.

A more recent development in the water-resistant gypsum board field is described in U.S. Pat. No. 4,647,496 to Lehnert and Randall, assigned to the same assignee as the present invention. This patent discloses a structural panel comprising a water-resistant set gypsum core sandwiched between two sets of porous fibrous mat. The preferred form of mat is described as a glass fiber mat formed from fiber glass filaments oriented in random pattern and bound together with a resin binder. Such panels differ from conventional gypsum wallboard in that the fibrous mat is substituted for paper as the facing materials of the gypsum core. Extensive outdoor testing has shown that glass mat-faced, water-resistant gypsum board of the type described in the aforementioned '496 patent has much better weathering characteristics, including water-resistant characteristics, in outdoor applications than water-resistant gypsum board covered with water-resistant paper facing. However, evaluation of such glass mat-faced board as a tile backer has revealed problems not unlike those encountered with the use of water-resistant board faced with water-resistant paper. Although glass mat has no tendency to delaminate like multi-ply paper, there is a tendency for moisture to dissolve and erode the gypsum of the glass mat-faced board. As this occurs, mastic with tile adhered thereto pulls away from the gypsum core. The loosened tile can eventually fall away from the wall. Evaluation has shown also that in some applications there is a faster deterioration of the glass mat/gypsum bond than the bond between paper and gypsum. This was observed in an application in which the core of a glass mat-faced gypsum board included wax-asphalt emulsion and under testing conditions which involved the use of warm water.

The present invention is related to the provision of an improved highly water-resistant, fibrous mat-faced gypsum board.

SUMMARY OF THE INVENTION

In accordance with the present invention, there is provided a water-resistant structural panel comprising a fibrous mat-faced gypsum board coated with a water-resistant resinous coating. In preferred form, the resinous coating has surface water-absorbing properties of not greater than about 1 gram. The means by which such properties are determined is described in detail below. Briefly, the coated surface of a predetermined size board test specimen is soaked in water for a two-hour period.

In preferred form, the gypsum board is faced with a glass fiber mat, the surface of which is coated with a water-resistant resinous coating in an amount when dry equivalent to at least about 50 lbs., preferably between about 65 and 120 lbs./1000 sq. ft. of board. The core of the board includes a water-resistant additive, and the board has a weight equivalent of no greater than about 2500 lbs./1000 sq. ft. More preferably, the dry coating is present in an amount equivalent to at least about 60 lbs., most preferably between about 80 and 100 lbs./1000 sq. ft., depending upon the thickness of the glass fiber mat.

Although the water-resistant resinous coating can be formed substantially entirely from the resin, it is preferred that the coating be formed from an aqueous coating composition comprising from about 15 to about 35 wt. % of resin solids, about 20 to about 65 wt. % of filler, and about 15 to about 45 wt. % of water.

Another aspect of the present invention is a method for forming a water-resistant structural panel comprising applying to the surface of a fibrous mat-faced gypsum board having a water-resistant gypsum core an aqueous coating composition containing resin solids dispersed therein, the amount of composition applied to said surface being equivalent when wet to at least about 90 lbs., preferably between about 100 and 180 lbs./1000 sq. ft. of board, thereby forming on said surface a wet film of said composition, and drying said wet film to form therefrom a water-resistant resinous coating having surface water-absorbing properties of no greater than about 1 gram.

There are numerous advantages associated with the use of the present invention. Of primary importance is that the coated board has superior water-resistant characteristics, and accordingly, can be used effectively for indefinite periods of time as a stable substrate supporting ceramic tiles or other water-resistant materials which are likely to be used in applications involving water contact and high humidity. An exemplary test assembly incorporating a coated board of the present invention, faced with fiber glass mat about 20 mils thick, has a vapor permeance of about 1.2 perms (ASTM E-96, dry cup method), and it is estimated the board with Type I mastic would have a vapor permeance of about 0.3 perm. A glass mat-faced board is mold- and rot-resistant which distinguishes it from paper-faced board which in the presence of moisture tends to degrade by virtue of mold growth and rotting. In addition, effective coated board within the present invention is relatively light in weight compared to Portland cement products which are used as tile backer. For example, an exemplary coated board within the scope of the present invention can be made at a weight of 3 lbs./sq. ft., whereas Portland cement-based tile backers are at least 50% heavier. It is noted also that although such cement-based backers are water-resistant, they, nevertheless, are water-absorbing. Inasmuch as water can penetrate through the board and come into contact with wooden or metal supports, it is recommended that a non-water-absorbing plastic sheet be installed between the back of the backer and the supports. This protects the supports from being degraded by water. In accordance with the present invention, it is not necessary to use such materials in that water is substantially prevented from passing through the coated board to the back side thereof.

It is noted that there are various types of adhesives that can be used to adhere ceramicstiles to a gypsum board support surface. Some of the adhesives include alkali which tend to degrade glass fibers. The water-resistant coating of the present invention functions to protect the glass fibers from degradation by such adhesives, and accordingly, offers the user the flexibility of being usable with various types of adhesives or mastic.

The coated board of the invention can be scored and cut more easily than cement-based board and because of its lighter weight, it can be made in larger size sheets.

In addition to providing improved resistance to water, the fire resistance of glass fibers mat-faced gypsum board is significantly enhanced by coating the face of the board with the water-resistant coating according to this invention. This is especially significant because water resistant wall assemblies in bathrooms, showers, and the like, especially in commercial buildings, are often located along party walls between occupants, often to allow for common plumbing lines between the walls. Such walls usually fall under building code regulations that call for fire resistive construction.

In order to achieve the required fire protection with Portland cement wallboard, the cavity between the walls must contain mineral wool, and the exterior wall surfaces must be completely tiled. This introduces extra expense, since tub and shower enclosures may ordinarily not be tiled to the full ceiling height. In order to meet building code requirements with gypsum board, a special fire rated ⅝ inch thick board must be used, and the resultant wall assembly is still vulnerable to water.

The fibrous mat-faced, water resistant gypsum board of this invention provides both the water and fire resistive properties which are required and, at the same time, significant economic and application advantages over the products currently available. Other attributes of the present invention will become apparent from the following detailed description.

DETAILED DESCRIPTION OF THE INVENTION

Turning first to a description of the fibrous mat-faced, water-resistant gypsum board for use in the present invention, it comprises a set gypsum core faced with a fibrous mat. The gypsum core is basically of the type used in those gypsum structural products which are known as gypsum wallboard, dry wall, gypsum board, gypsum lath and gypsum sheathing. The core of such a product is formed by mixing water with powdered anhydrous calcium sulfate or calcium sulfate hemihydrate ($CaSO_4.\frac{1}{2}H_2O$), also known as calcined gypsum, and thereafter allowing the mixture to hydrate or set into calcium sulfate dihydrate ($CaSO_4.2H_2O$), a relatively hard material. The core of the product will in general comprise at least about 85 wt. percent of set gypsum.

The composition from which the set gypsum core is made can include optional constituents, including, for example, those included conventionally in gypsum sheathing. Examples of such constituents include set accelerators, retarders, foaming agents, reinforcing fibers, and dispersing agents. As will be described in more detail below, a preferred gypsum core includes one or more additives which improve the water-resistant properties of the core.

The surface of the core of the gypsum board is faced with a fibrous mat. The fibrous mat should be sufficiently porous to permit water in the aqueous gypsum slurry from which the gypsum core is made to evaporate therethrough. The fibrous mat-faced gypsum board can be made efficiently by forming an aqueous gypsum slurry which contains excess water and placing thereon the fibrous mat. Aided by heating, excess water evaporates through the porous mat after the calcined gypsum sets.

The fibrous mat comprises material which is capable of forming a strong bond with the set gypsum comprising the core of the gypsum board. Examples of such materials include a mineral-type material such as glass fibers and synthetic resin fibers. The mat can comprise continuous or discrete strands or fibers and be woven or nonwoven in form. Nonwoven mats such as chopped strand mat and continuous strand mat can be used satisfactorily and are less costly than woven materials. The strands of such mats are bonded together by suitable adhesive. The mat can range in thickness, for example, from about 10 to about 40 mils, with a thickness of about 15 to about 35 mils being preferred. The aforementioned fibrous mats are known and are commercially available in many forms.

The preferred fibrous mat is a fiber glass mat comprising fiber glass filaments oriented in random pattern and bound together with a resin binder. Fiber glass mats of this type are commercially available, for example, those sold under the trademark DURA-GLASS by Manville Building Materials Corporation and those sold by Elk Corporation as BUR or shingle mat.

A DURA-GLASS mat which is useful in the structural building applications described in U.S. Pat. No. 4,647,496 is nominally 33 mils thick and incorporates glass fibers about 16 microns in diameter. Although certain structural applications may utilize a thicker mat, a glass fiber mat nominally 20 mils thick, which includes glass fibers about 10 microns in diameter, is preferred in the tile backer application.

The water-resistant coating is more uniformly applied over the mat which is 20 mils thick, the mat is less irritating to the skin, and less airborne glass fiber dust is produced during the coating operation. Moreover, use of 20 mil mat versus 33 mil mat results in substantial savings in the cost of the water-resistant coating, because the amount applied can be less, and a significant increase in production speed, because the thinner coating dries more quickly. Furthermore, the tensile strength of the gypsum board is not substantially affected.

Although improvements can be realized by the use of a gypsum core which has but one of its surfaces faced with fibrous mat as described herein, it is preferred that both surfaces of the core be faced with substantially the same fibrous material. If the surfaces of the core are faced with materials that have different coefficients of expansion, the core tends to warp. Fibrous mat-faced gypsum board and methods for making the same are known, for example, as described in aforementioned U.S. Pat. No. 4,647,496, and in Canadian Patent No. 993,779 and U.S. Pat. No. 3,993,822.

The fibrous mat-faced gypsum board for use in the present invention comprises a gypsum core which has water-resistant properties. The preferred means for imparting water-resistant properties to the gypsum core is to include in the gypsum composition from which the core is made one or more additives which improve the ability of the set gypsum composition to resist being degraded by water, for example, to resist dissolution. In preferred form, the water-resistance of the coated board is such that it absorbs less than about 10%, preferably less than about 7.5%, and most preferably less than about 5% water when tested in accordance with the immersion test of ASTM method C-473.

Examples of materials which have been reported as being effective for improving the water-resistant properties of gypsum products are the following: poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; a wax-asphalt emulsion with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product.

A material which has been used widely in improving the water-resistant properties of the gypsum core of wallboard comprises wax-asphalt emulsion, species of which are available commercially. The wax portion of the emulsion is preferably a paraffin or microcrystalline wax, but other waxes can be used also. The asphalt in general should have a softening point of about 115° F., as determined by the ring and ball method. The total amount of wax and asphalt in the aqueous emulsion will generally comprise about 50 to about 60 wt. percent of the aqueous emulsion, with the weight ratio of asphalt to wax varying from about 1 to 1 to about 10 to 1. Various methods are known for preparing the wax-asphalt emulsion, as reported in U.S. Pat. No. 3,935,021 to D. R. Greve and E. D. O'Neill, assigned to the same assignee as the present invention. Commercially available wax asphalt emulsions that can be used in the composition described herein are sold by United States Gypsum Co. (Wax Emulsion), Monsey Products (No. 52 Emulsion), Douglas Oil Co. (Docal No. 1034), and Conoco (No. 7131). The amount of wax-asphalt emulsion used can be within the range of about 3 to about 10 wt. %, preferably about 5 to about 7 wt. %, based on the total weight of the ingredients of the composition from which the set gypsum core is made, said ingredients including the water of the wax-asphalt emulsion, but not including additional amounts of water that are added to the gypsum composition for forming an aqueous slurry thereof.

The use of a mixture of materials, namely, poly(vinyl alcohol) and wax-asphalt emulsion of the aforementioned type to improve the water resistance of gypsum products is described in aforementioned U.S. Pat. No. 3,935,021. The source of the poly(vinyl alcohol) is preferably a substantially completely hydrolyzed form of poly(vinyl acetate), that is, about 97 to 100% hydrolyzed polyvinyl acetate. The poly(vinyl alcohol) should be cold-water insoluble and soluble in water at elevated temperatures, for example, at temperatures of about 140° to about 205° F. In general, a 4 wt. % water solution of poly(vinyl alcohol) at 20° C. will have a viscosity of about 25 to 70 cp as determined by means of the Hoeppler falling ball method. Commercially available poly(vinyl alcohols) for use in the composition of the present invention are available from E.I. du Pont de Nemours and Company, sold under the trademark "Elvanol" and from Monsanto Co., sold under the trademark "Gelvatol". Examples of such products are Elvanol, Grades 71-30, 72-60, and 70-05, and Gelvatol, Grades 1-90, 3-91, 1-60, and 3-60. Air Products Corp. also sells the product as WS-42.

The amounts of poly(vinyl alcohol) and wax-asphalt emulsion used should be at least about 0.05 wt. % and about 2 wt. % respectively. The preferred amounts of poly(vinyl alcohol) and wax-asphalt emulsion are about 0.15 to about 0.4 wt. % and about 3 to about 5 wt. %, respectively. Unless stated otherwise, the term "wt. %" when used herein and in the claims means weight percent based on the total weight of the ingredients of the composition from which the set gypsum core is made, said ingredients including the water of the wax-asphalt emulsion, but not including additional amounts of water that are added to the gypsum composition for forming an aqueous slurry thereof.

A preferred water-resistant additive for use in the core of the gypsum-based core is an organopolysiloxane, for example, of the type referred to in U.S. Pat. Nos. 3,455,710; 3,623,895; 4,136,687; 4,447,498; and 4,643,771. Within this class of materials, poly(methylhydrogen-siloxane) is particularly preferred. The amount of the organopolysiloxane should be at least about 0.2 wt. %. A preferred amount falls within the range of about 0.3 to about 0.6 wt%.

In preferred form, the core of fibrous mat-faced gypsum board has a density of about 40 to about 55 lbs/cu. ft., most preferably about 46 to about 50 lbs/cu. ft. The manufacture of cores of predetermined densities can be effected by using known techniques, for example, by introducing an appropriate amount of foam into the aqueous gypsum slurry from which the core is formed.

In accordance with the present invention, there is applied to the surface of the fibrous mat facing of the gypsum wallboard a highly water-resistant resin or mixture of resins. The resin can be applied conveniently to the fibrous mat in the form of solid particles which coalesce to form a continuous coating which is free from or virtually free from pin holes and other defects which would permit the penetration of moisture. The coating should be sufficiently thick to cover completely the fibrous constituents of the mat and to the extent that substantially no fibers protrude from the coating. In effect, the resinous coating forms a barrier which protects the underlying set gypsum from moisture which would tend to dissolve the set gypsum, and thereby cause deterioration of the bond between the fibrous mat and the gypsum to which it is adhered. The coating can comprise a thermoplastic or a thermoset resin.

There are numerous commercially available resins which are claimed by their manufacturers to be effective in forming highly water-resistant coatings. However, for the purposes of the present invention, evaluations have shown that there are significant differences in the water-resistant characteristics of coatings depending on the particular resins from which the coatings are formed. The preferred resins for use in forming the water-resistant coatings of the present invention are those which are capable of forming a coating having a surface water absorption value of no greater than about 0.5 gram, as measured by a test which is referred to herein as "Modified Cobb Test". The Modified Cobb Test is an effective way of determining the degree of surface water absorption of resin-coated samples of fibrous mat-faced gypsum board and of identifying preferred resins for use in the practice of the present invention. The test involves the use of a 5"×5" specimen which can be cut from the board to be evaluated or which can otherwise be prepared. The specimen is coated by use of a roller with an amount of coating composition sufficient to cover completely the glass mat (substantially no protruding fibers), i.e., a wet coating weight between about 90 and 180 lbs./1000 sq. ft. of board depending upon the glass mat. Care is taken to avoid the use of an excess amount of coating composition. After the coating composition is completely dry, the specimen is conditioned for constant weight at 70° F.±10° F. and 50±10% relative humidity. The test apparatus and materials include a 4½" inside diameter×1" high Cobb ring and stop-cock grease. The grease is applied liberally to that edge surface of the ring which is pressed onto the test specimen. The ring, seated on the specimen, is filled with water having a temperature of 125° F. A 5"×5" cover sheet consisting of a piece of plastic or waxed paper is allowed to remain in contact with the water for 2 hours. After the 2-hour period, the cover sheet is removed, and water is poured out of the ring as care is taken to avoid wetting the edges of the specimen. Residual water is removed from the assembly by blotting with a dry absorbent paper towel. Care is taken so as not to remove any grease around the ring. The assembly is again weighed to within 0.01 gram. The surface water absorption is reported as the difference between dry and wet weights of the test assembly.

The preferred manner for forming the water-resistant coating of the present invention is to apply to the fibrous mat-faced gypsum board an aqueous dispersion of the resin, that is, a latex. Although the coating can be formed of substantially 100% of the water-resistant resin, it has been found that good results can be achieved also by forming the coating from a mixture of resin and filler. Examples of fillers that can be used are silicates, silica, gypsum and calcium carbonate, the last mentioned being particularly preferred. It should be understood that other filler-type materials which are compatible with the resin constituent and which do not interfere with the formation of the water-resistant coating can be used also.

In particularly preferred form, the water-resistant coating of the present invention is formed from a water-based composition comprising about 15 to about 35 wt. % resin solids, about 20 to about 65 wt. % filler in finely divided form, and about 15 to about 45 wt. % water. Conventional additives of the type generally used in latex paint compositions can be used also in the coating composition of the present invention. In general, the total amount of such additives will be within the range of about 1 to about 5 wt. %. Examples of such additives include pigment, thickener, defoamer, dispersant and preservative.

The viscosity of the composition can be like that of a conventional latex paint. It is recommended that viscosity of the coating composition be equivalent to a Brabender number in the range of about 50 to about 100 (room temperature).

A preferred resin for use in the practice of the present invention is available in the form of a latex sold by Unocal Chemicals Division of Unocal Corporation under the mark 76 RES 1018. The pH and solids content of the latex are respectively 7.5–9.0 and 50%. The resin is a styrene-acrylic copolymer which has a relatively low film-forming temperature (20° C.) and a Tg of 22° C. Coatings formed from the resin can be dried effectively at temperatures within the ranges of about 300° to 400° F. If desired, a coalescing agent can be used to lower the film-forming temperature.

As mentioned above, the amount of coating applied to the surface of the fibrous mat should be sufficient to embed the mat completely in the coating and to the extent that substantially no fibers protrude through the coating. The amount of coating required is dependent upon the thickness of the mat. Using a glass fiber mat nominally 33 mils thick (e.g., about 16 micron fibers), the amount of coating when dried should be equivalent to at least about 50 lbs., preferably about 100 lbs./1000 sq. ft. of board; using a fiber glass mat nominally 20 mils thick (e.g., 10 micron fiber), a lesser amount of coating may be used. Although higher or lower amounts of coating can be used, it is believed that, for most applications, the amount of coating will fall within the range of about 60 to about 100 lbs./1000 sq. ft. of board (dry basis). In particularly preferred form, applied to 33 mil mat, the dry coating should weigh about 70 to about 80 or 100 lbs./1000 sq. ft. of board; applied to 20 mil mat, the dry coating should weigh about 80 lbs./1000 sq. ft. of board.

With respect to the thickness of the coating, it is difficult to measure thickness because of the uneven nature of the fibrous mat. In rough terms, the thickness of the coating should be at least about 10 mils, but when the glass mat is relatively thin and the coating is efficiently dried, a coating as thin as 4 mils may suffice. In general, the thickness need not exceed about 30 mils.

The coating composition can be applied by any suitable means, for example, spray, brush, curtain coating, and roller coating, the last mentioned being preferred. The amount of wet composition applied can vary over a wide range. It is believed that amounts within the range of about 90 or 100 to about 150 or 180 lbs./1000 sq. ft. of board will be satisfactory for most applications.

The coating composition can be applied as one coat or, preferably, two or more coats. The surface of the board can be room temperature or it can be preheated.

It can be advantageous to use heat to accelerate drying of the water-based coating composition. Drying temperatures used will generally depend on the nature of the particular resin that is used. Some resins are capable of coalescing and forming uniform coatings at room temperature or even below room temperature. Nevertheless, the coalescence of such resins can be accelerated through the use of heat. Some resins will require the use of heat to effect coalescence of the resin particles. It is believed that temperatures within the range of about 200° to about 500° F. will be effective for most applications.

It is believed that coating of but one side of the board will be satisfactory for most applications. However, if desired, both sides can be coated. The weight of the coated board (½") should not exceed about 2500 lbs./1000 sq. ft. Typically, the coated board will weigh at least about 1900 lbs./1000 sq. ft.

Any suitable mastic can be used to adhere tiles or other materials to the coated fibrous mat-faced board. Type I mastic has been used very effectively. However, dry-set mortars and mortars made from latex/Portland cement can be used also. The mastic can be applied using conventional means, for example, with a notched applicator. Joints and corners of the board should be taped according to the usual means, for example, with a 2" woven glass mesh tape.

Coated board of the present invention can be used effectively in other applications, including outdoor and indoor applications. For example, the coated board can be used in applications of the type where conventional gypsum sheathing is applied as a support surface for overlying materials such as wood siding, stucco, synthetic stucco, aluminum, brick, including thin brick, outdoor tile, stone-aggregate and marble. Some of the aforementioned can be used advantageously in a manner such that they are adhered directly to the coated board. The coated board can be used also as a component of exterior insulating systems, commercial roof deck systems, and exterior curtain walls. In addition, the coated board can be used effectively in applications not generally involving the use of paper-faced gypsum board. Examples of such applications include walls associated with saunas, swimming pools, and gang showers.

Examples which follow are illustrative of the invention.

EXAMPLES

Example No. 1

The formulation set forth below is an example of an aqueous gypsum slurry which can be used in making the core of a fibrous mat-faced gypsum board for use as a tile backer in accordance with the present invention.

| Constituents | Lbs./1000 sq. ft. of Board |
|---|---|
| calcined gypsum (CaSO$_4$.½H$_2$O) | 1500 |
| wax/asphalt emulsion | 130 |
| aqueous solution of 10 wt. % poly(vinyl alcohol) | 56 |
| paper fiber | 15 |
| set accelerator | 6 |
| ammonium lauryl sulfonate (foaming agent) | 1 |
| calcium lignosulfonate (dispersing agent) | 2 |
| water | 0 |

The wax/asphalt emulsion used in the above formulation contained approximately 48 wt. % solids of which about 11 wt. % was paraffin wax and about 37 wt. % was asphalt. The set accelerator comprised about 80 wt. % potash, about 12 wt. % lignosulfonate and about 8 wt. % ground gypsum.

The above formulation was used to prepare gypsum board, the surfaces of which were covered with nonwoven fiber glass-mat. The mat was composed of glass fiber filaments, nominally 16 microns in diameter, oriented in a random pattern bonded together by an adhesive referred to by the manufacturer as a "modified urea-formaldehyde resin". The mat had a thickness of 33 mils and was more porous than paper of the type used as the cover sheet of gypsum wallboard. The air permeability of the mat was 700 CFM/sq. ft. (test method FG 436-910). The mat is available commercially as DURA-GLASS 7502-2 lbs. or as #7590 and is an example of a preferred fibrous mat for use in the practice of the present invention. Another glass fiber mat, most preferred for reasons set forth above, is available commercially as DURA-GLASS #7529, which is also a random oriented material containing glass fibers about 10 microns in diameter, the mat being nominally 20 mils thick. The air permeability of the latter mat is no greater than 600 CFM/sq. ft.

Continuous length board was made from the above gypsum slurry and 16 micron glass fiber mat on a conventional wallboard machine. Drying of the gypsum board is accelerated by heating in an oven at about 400° F. for about thirty minutes and until the board is almost dry and then at 200° F. for about fifteen minutes until it is dried completely. The density of the board is about 48 lb./cu. ft. Gypsum wallboard incorporating glass fiber mat about 20 mils thick and containing glass fibers about 10 microns in diameter is similarly produced.

In accordance with the present invention, the following coating composition was prepared.

| Ingredients | Amounts, wt. % |
|---|---|
| (A) aqueous dispersion of styrene-acrylic resin copolymer[1] | 47.08 |
| (B) limestone (filler) | 39.23 |
| (C) calcined kaolin clay (pigment) | 1.60 |
| (D) lampblack (pigment) | 0.26 |
| (E) modified bentonite clay (TIXOGEL thickener) | 0.80 |
| (F) fatty acid/polyglycol (NALCO 71D5 defoamer) | 0.16 |
| (G) sodium polyacrylate (ALCOSPERSE 149 dispersant) | 0.09 |
| (H) 1,2-benzothiazolin-3-one-ethylene diamine (PROXEL-CRL preservative) | 0.05 |
| (I) added water | 10.75 |

[1]76 RES 1018 latex - available from Unocal Chemicals Division of Unocal Corporation, 50% solids The above coating composition is applied to one of the glass mat surfaces of a gypsum board like that described above, which includes fiber glass mat about 33 mils thick. The composition is applied by a roller and in an amount equivalent when wet to about 150 lbs./1000 sq. ft. The wet coating composition is dried for about three minutes in an infra-red drying oven having a temperature range of 300°–500° F. The dried weight of the resin coating is equivalent to about 100 lbs./1000 sq. ft. The weight of the resin coated board is equivalent to about 2000 lbs./1000 sq. ft. The coating completely covered the glass mat. There was no protrusion of glass fibers through the coating, which was substantially free of pinholes and other defects. The above coating composition is similarly applied to gypsum board faced with fiber glass mat about 20 mils thick (i.e., 10 micron glass fibers), except that the wet coating weight is about 120 lbs./1000 sq. ft., and the dried coating weighs about 80 lbs./1000 sq. ft.

Resin-coated glass mat-faced gypsum board similar to that described in Example No. 1 was exposed to intermittent wetting and drying conditions for a period of approximately 65 days. The test assembly used in this testing included a shower stall approximately 4'×4'×6½' high which was framed with 2×4 wood studs, 16" O.C. One-half-inch board was applied horizontally and secured to the framing with 1" drywall screws spaced 12" O.C. This resulted in a horizontal joint at mid-height. In order to increase the severity of the test, the board was set in contact with the floor. Ceramic tile measuring 4"×4" were attached with ceramic tile adhesive (American Olean Tile #aO 1700, Type I.) Tile adhesive was applied using a square trowel with ¼" notched square teeth. The tile joints were left ungrouted and plumbing penetrations uncalked to further increase the severity of the test. The tile installation was allowed to cure ninety-six hours before commencement of the test.

The test cycle included the use of a rotating sprinkler head which was suspended approximately in the center of the shower stall. The sprinkler was set to run for fifteen minutes each hour, five days a week, and cut off over the weekends to allow for drying. Water temperature was maintained at 105° F.±4° F. by means of a temperature-sensitive control valve. The test cycle was continued uninterrupted for approximately sixty-five days.

Periodic observations were made during the test period. After approximately sixteen days, two tiles came loose. Examination revealed that the bond between the tile and the tile adhesive failed. The failure did not occur in the coated board. At the end of the 65-day test period, it was observed that water had penetrated into the gypsum only at the base of the assembly where the board was in contact with the floor and at the point of uncaulked plumbing penetrations. It was noted that in the areas where water penetrated, the integrity of the gypsum to glass mat bond was not affected.

Coating compositions for use in the practice of the present invention and comparative coating compositions were prepared and evaluated according to the Modified Cobb Test. Each of the compositions contained the following constituents.

| Ingredients | Amounts, wt. % |
| --- | --- |
| aqueous dispersion of resin (identified in Table 1 below) | 53.52 |
| limestone (filler) | 38.36 |
| calcined kaolin clay (pigment) | 1.55 |
| lamp black (pigment) | 0.27 |
| modified bentonite clay (TIXOGEL thickener) | 0.77 |
| defoamer like that of Ex. 1 | 0.10 |
| dispersant like that of Ex. 1 | 0.09 |
| added water | 5.35 |

Samples of glass mat-faced gypsum board (16-micron glass mat) were coated with four coating compositions which were applied to the samples in an amount equivalent to about 120 lb./1000 sq. ft. The coated samples were dried for about 3 minutes in an oven having a temperature of 400° F.

The four coating compositions that were used to coat the samples were alike in all respects except for the resin constituent. Two of the resins from which the compositions were formulated are exemplary of resins that can be used pursuant to the present invention. The other two resins that were used are comparative. The resins are identified in Table 1 below which includes also the results of the tests.

TABLE 1

| Ex. No. | Resin | Test Results, gms. |
| --- | --- | --- |
| 2 | poly(vinylidene chloride-butyl-methacrylate-methylmethacrylate-copolymer) latex (76 RES 917), 50% solids | 0.0 |
| 3 | styrene-acrylic resin copolymer latex (76 RES 1018), 50% solids | 0.3 |
| C-1 | ethylene-vinyl chloride resin latex (Airflex EVCL 4530), 50% solids | 1.8 |
| C-2 | poly(vinylidene chloride-butyl-acrylate-methylmethacrylate copolymer) latex (76 RES 5517), 61% solids | 5.0 |

Resins of the compositions of Table 1 are advertised by their manufacturers as having excellent water-resistant characteristics. However, it can be seen that only those used in the compositions of Example Nos. 2 and 3 meet the requirements of the present development.

Another comparative coating composition was made from the following constituents which included a mixture of resins.

| Example C-3 | |
| --- | --- |
| Ingredients | Amounts, wt. % |
| aqueous dispersion of ethylene-vinyl chloride resin latex (Airflex EVCL 4530), 50% solids | 40.20 |
| aqueous dispersion of polyethylene (Michemlube 110), 30% solids | 10.05 |
| limestone (filler) | 41.70 |
| calcined kaolin clay (pigment) | 1.68 |
| lamp black (pigment) | 0.27 |
| modified bentonite clay (TIXOGEL thickener) | 0.84 |
| defoamer like that of Ex. 1 | 0.17 |
| dispersant like that of Ex. 1 | 0.10 |
| added water | 5.03 |

The composition was used to coat board samples in the same manner as described above in connection with the examples of Table 1. Evaluation of the coated samples was like that of the examples of Table 1. The surface water absorbency was 2.4 g.

Example No. 4

Gypsum boards, nominally 0.5 in. thick, produced as described in Example No. 1 above, both with and without the water-resistant coating applied to one of the glass mat faces, were evaluated for fire resistance in pilot tests. In these tests, the boards were nailed horizontally to 2 in.×4 in. wood studs spaced 16 in. o.c. The faces of the mounted boards were exposed to flame and the temperature of the structure followed with thermocouples. It was observed that gypsum board with the water-resistant coating of this invention had a fire endurance end point of 51-52 min., whereas gypsum board without the coating had a fire endurance end point of 42.5-44 min. For these test purposes the fire endurance end point is defined as the length of flame exposure time required to raise the average stud temperature to 975 degrees F. The fire endurance end point so determined correlates with structural failure in a full scale fire test conducted under design loading. In general, it is very difficult to prevent structural failure in a time less than 45 min. using this test.

Example No. 5

Gypsum boards, nominally 0.5 in. thick, produced as described in Ex. 1 and utilizing the described coating, were subjected to a pilot fire test. In this test, the boards were nailed horizontally to 2 in.×4 in. wood studs spaced 16 in. o.c. The cavity space between the studs and facing boards was filled with 3½" unfaced fiberglass batts. Fire exposure, consistent with ASTM E-119, was for one hour. This test demonstrated the capability of successfully achieving a 1 HR. Fire Resistance Rating, heretofore attained only with ⅝" facing boards, on the basis of the undamaged stud depth following the test (2⅛" to 2¼" of the original 3½", i.e., 61%–64%, remained uncharred). In a full scale load-bearing test, structural failure would occur with 35%–50% of the stud uncharred.

Example No. 6

Gypsum boards nominally 0.5 in. thick, produced as described in Ex. 1 and utilizing the decribed coating, were subjected to a full scale fire test in accordance with ASTM E-119. In this test, the boards were attached to 2½" metal studs and track, with studs spaced 16 in. o.c. The cavity was filled with 3½" unfaced fiberglass batts. This assembly not only qualified for the 1 HR. Fire Resistance Rating but also had extremely low surface temperatures at the end of the 1 hr. test. The average temperature rise at 1 hr. was only 142° F., compared to the allowed 250° F. rise.

Although it is only speculated, the enhanced fire resistance of the gypsum board carrying the water-resistant coating may be due to a decreased tendency of the board to crack during the test. Such cracking could occur as the gypsum core of the board becomes dehydrated and shrinks. The low moisture vapor permeance of the coated board may decrease the rate at which the gypsum dehydrates. In addition, the heat capacity and thermal transfer characteristics of the board may be significantly affected by retaining the water within the board; a typical 4'×8' board contains about 12 lbs. of water.

Test results reported above highlight the significant differences in surface water-absorbing and transmission properties that are possessed by coatings depending on the resin from which the coating is formed. The present invention provides the means for evaluating the surface water-absorbing properties of resins for use in forming superior water-resistant resinous coatings. The present invention provides also the means which enable one to construct gypsum-based support surfaces which are capable of resisting for indefinite periods of time attack by water, both in indoor and outdoor applications, and to offer significantly enhanced fire resistance. In summary, it can be said that the improved gypsum-based product of the present invention has water-resistant properties which are at least equal to or better than prior art products, and that this is achieved in a product that is lighter in weight and more economical to make than prior art products.

We claim:

1. A water-resistant structural panel comprising
a gypsum core;
a porous mat comprising mineral fibers facing at least one surface of said core;
a substantially humidity- and water-resistant resinous coating containing a latex of resin solids mixed with water, said coating covering said mat to the extent that substantially none of said mineral fibers protrude from said coating,
wherein said faced and coated surface of said core has a Modified Cobb Test surface water absorption value of no greater than about 0–2.4 grams, said coating capable of bonding with Portland cement-based mortar.

2. A panel according to claim 1 wherein said absorption value is no greater than about 0.5 gram.

3. A panel according to claim 1 or 2 wherein said coating comprises substantially 100% of one or more of water-resistant resins.

4. A panel according to claim 1 wherein said fibrous mat contains glass fibers nominally about 10 microns in diameter.

5. A panel according to claim 1 or 2 wherein said coating comprises a mixture of one or more of a water-resistant resin and filler.

6. A water-resistant structural panel comprising
a gypsum board consisting essentially of a set gypsum core sandwiched between and faced with glass fiber mats, the surface of one of said mats being coated with a latex resinous coating, said coating containing at least about 15 wt. % resin solids, filler, and water,
said coating upon drying and setting being substantially non-water-absorbing when exposed to water and humidity and disposed in an amount when dry equivalent to at least about 50 lbs./1000 sq. ft. of board and covering said mat to the extent that substantially none of the fibers of said mat protrude from said coating,
and the core of said board including therein a water-resistant additive in an amount sufficient to improve the water-resistant properties of said core,
the coating when dry capable of bonding with aqueous Portland cement-based mortar and having a Modified Cobb Test surface water absorption value of no greater than about 0–2.4 grams, the coated board having a weight equivalent to no greater than about 2500 lbs./1000 sq. ft. when ½" thick.

7. A panel according to claim 6 wherein said coating is formed from an aqueous coating composition consisting essentially of about 15 to about 35 wt. % of resin solids, about 20 to about 65 wt. % of filler, and about 15 to about 45 wt. % of water.

8. A panel according to claim 7 wherein said composition includes about 1 to about 5 wt. % of one or more additives selected from the group consisting of a thickener, dispersant, pigment, defoaming agent and preservator.

9. A panel according to claim 6 wherein said coating when dry is present in an amount equivalent to no more than about 100 lbs./1000 sq. ft. of board.

10. A panel according to claim 6 wherein said gypsum core is such that it absorbs no more than about 10 wt. % of water when tested in accordance with ASTM method C-473.

11. A panel according to claim 6 wherein the amount of said water-resistant additive is at least about 0.2 wt. %.

12. A panel according to claim 6 wherein the amount of said water-resistant additive is about 0.3 to about 10 wt. %

13. A panel according to claim 6 wherein said additive comprises wax-asphalt emulsion.

14. A panel according to claim 6, 7, 8, 9, 10, 11 or 12 wherein said additive comprises a polysiloxane.

15. A panel according to claim 6, 7, 8, 9, 10, 11, 12 or 13 wherein said surface water absorption value is no greater than about 0.5 gram.

16. A panel according to claim 14 wherein said surface water absorption value is no greater than about 0.5 gram.

17. A panel according to claim 6 wherein the resin of said coating consists essentially of a styrene-acrylic copolymer.

18. A panel according to claim 6 wherein the resin of said coating consists essentially of a poly(vinylidenecopolymer).

19. A tile backer substrate capable of bonding with Portland cement-based mortar and comprising a fibrous glass mat-faced gypsum board coated with a substantially humidity- and water-resistant resinous latex coating containing at least about 15 wt. % resin solids prior to drying, said coating covering said mat to the extent that substantially none of the fibers of said mat protrude from said coating, said substrate having a Modified Cobb Test value of about 0–2.4 grams.

20. The tile backer substrate of claim 19, wherein said resinous coating has a vapor permeance of about 1.2 perms when tested in accordance with ASTM Dry Cup Method E-96.

21. The tile backer substrate of claim 19, wherein said resinous coating contains about 20–65 wt. % filler.

22. A water-resistant structural panel capable of bonding with Portland cement-based mortar and comprising a fibrous mat-faced gypsum board coated with a resinous latex coating containing resin solids and water, said coating upon setting and drying being substantially non-water-absorbing when exposed to water and humidity, said coating covering said mat to the extent that substantially none of the fibers of said mat protrude from said coating, said substrate being substantially free of pin holes capable of penetration by moisture and having a Modified Cobb Test value of about 0–2.4 grams.

23. The structural panel of claim 22 having a $\frac{1}{2}$" board weight not exceeding about 2,500 lbs./1,000 cu. ft.

24. The structural panel of claim 22, wherein said resinous coating has a vapor permeance of about 1.2 perms when tested in accordance with ASTM Dry Cup Method E-96.

25. The structural panel of claim 22, wherein said latex coating comprises at least about 15 wt. % resin solids.

26. The structural panel of claim 25 further comprising a filler.

27. The structural panel of claim 26 further comprising an additive selected from a pigment, thickener, defoamer, dispersant, preservative, or a combination thereof.

28. The structural panel of claim 22, wherein said latex coating comprises a top and primer layer.

29. The structural panel of claim 22, wherein said latex coating comprises about 15–35 wt. % resin solids, 20–65 wt. % filler, and up to about 5 wt. % of an additive selected from a pigment, thickener, defoamer, dispersant, preservative, or a mixture thereof.

* * * * *

UNITED STATES PATENT AND TRADEMARK OFFICE
CERTIFICATE OF CORRECTION

PATENT NO.   :  5,397,631
DATED        :  March 14, 1995
INVENTOR(S)  :  G.W. Green, et al.

It is certified that error appears in the above-indentified patent and that said Letters Patent is hereby corrected as shown below:

Column 2, line 33, "multiply" should be
    --multi-ply--.

Column 5, line 13, "ceramicstiles" should be
    --ceramic tiles--.

Column 17, claim 18, line 13, "(vinylidenecopolymer)"
    should be --(vinylidene-copolymer)--.

Signed and Sealed this

Sixth Day of June, 1995

Attest:

BRUCE LEHMAN

*Attesting Officer*          *Commissioner of Patents and Trademarks*